(12) United States Patent
Nagasu et al.

(10) Patent No.: US 10,578,796 B2
(45) Date of Patent: Mar. 3, 2020

(54) OPTICAL FIBER AND METHOD FOR MANUFACTURING SAME

(71) Applicant: FUJIKURA LTD., Tokyo (JP)

(72) Inventors: Katsubumi Nagasu, Chiba (JP); Ryo Maruyama, Chiba (JP)

(73) Assignee: Fujikura Ltd., Tokyo (JP)

(*) Notice: Subject to any disclaimer, the term of this patent is extended or adjusted under 35 U.S.C. 154(b) by 0 days.

(21) Appl. No.: 16/090,106

(22) PCT Filed: Mar. 29, 2017

(86) PCT No.: PCT/JP2017/012833
§ 371 (c)(1),
(2) Date: Sep. 28, 2018

(87) PCT Pub. No.: WO2017/170652
PCT Pub. Date: Oct. 5, 2017

(65) Prior Publication Data
US 2019/0113678 A1      Apr. 18, 2019

(30) Foreign Application Priority Data

Apr. 1, 2016 (JP) ................................. 2016-074662

(51) Int. Cl.
*G02B 6/02* (2006.01)
*G02B 6/036* (2006.01)
(Continued)

(52) U.S. Cl.
CPC .......... *G02B 6/02042* (2013.01); *C03C 25/24* (2013.01); *G02B 6/02019* (2013.01);
(Continued)

(58) Field of Classification Search
CPC ............ G02B 6/02042; G02B 6/02019; G02B 6/0281; G02B 6/0283; G02B 6/036;
(Continued)

(56) References Cited

U.S. PATENT DOCUMENTS 7,689,085 B1    3/2010  Mishra
2001/0017967 A1  8/2001  Hirano et al.
(Continued)

FOREIGN PATENT DOCUMENTS

CN    1576916 A    2/2005
CN    104822635 A  8/2015
(Continued)

OTHER PUBLICATIONS office Action issued in corresponding Japanese Patent Application No. 2018-012001 dated Nov. 20, 2018 (3 pages).
(Continued)

*Primary Examiner* — Jerry M Blevins
(74) *Attorney, Agent, or Firm* — Osha Liang LLP (57) ABSTRACT

An optical fiber includes: a core; a cladding layer that is lower in refractive index than the core; and a depressed layer that lies between the core and the cladding layer and that is lower in refractive index than the cladding layer, wherein: the optical fiber has an effective core area Aeff that is equal to or greater than 100 $\mu m^2$ and equal to or less than 129 $\mu m^2$, the core has a radius r1 that is equal to or greater than 5.2 $\mu m$ and equal to or less than 7.4 $\mu m$, the core has a refractive index volume Vcore that is equal to or greater than 8.5% $\mu m^2$ and equal to or less than 16.5% $\mu m^2$, the depressed layer has a refractive index volume Vdep that is equal to or greater than −40% $\mu m^2$ and less than 0% $\mu m^2$.

10 Claims, 4 Drawing Sheets

(51) Int. Cl.
  *C03C 25/24* (2018.01)
  *G02B 6/44* (2006.01)
  *G02B 6/028* (2006.01)

(52) U.S. Cl.
  CPC ......... *G02B 6/0281* (2013.01); *G02B 6/0283* (2013.01); *G02B 6/036* (2013.01); *G02B 6/0365* (2013.01); *G02B 6/03627* (2013.01); *G02B 6/44* (2013.01)

(58) Field of Classification Search
  CPC .... G02B 6/03627; G02B 6/0365; G02B 6/44; C03C 25/24
  USPC ......................................................... 385/127
  See application file for complete search history.

(56) References Cited

U.S. PATENT DOCUMENTS

| | | | |
|---|---|---|---|
| 2004/0264896 A1* | 12/2004 | Takahashi | C03C 13/047 385/103 |
| 2010/0195966 A1 | 8/2010 | Bickham et al. | |
| 2011/0222828 A1 | 9/2011 | Sasaoka et al. | |
| 2012/0141078 A1* | 6/2012 | Mukasa | G02B 6/02019 385/124 |
| 2013/0230290 A1 | 9/2013 | Evans et al. | |
| 2014/0178018 A1* | 6/2014 | Matsuo | G02B 6/02042 385/98 |
| 2014/0328566 A1 | 11/2014 | Bickham et al. | |
| 2015/0226915 A1 | 8/2015 | Kawaguchi et al. | |
| 2016/0011365 A1* | 1/2016 | Berkey | G02B 6/02014 385/127 |

FOREIGN PATENT DOCUMENTS

| | | |
|---|---|---|
| CN | 105209946 A | 12/2015 |
| JP | 2003-262752 A | 9/2003 |
| JP | 2005-202440 A | 7/2005 |
| JP | 2007-286238 A | 11/2007 |
| JP | 2008-209654 A | 9/2008 |
| JP | 2011-209702 A | 10/2011 |
| JP | 2012-037621 A | 2/2012 |
| JP | 2012-516473 A | 7/2012 |
| JP | 2013-061620 A | 4/2013 |
| JP | 2013-122502 A | 6/2013 |
| JP | 2013-178497 A | 9/2013 |
| JP | 2015-166853 A | 9/2015 |
| JP | 2016-12123 A | 1/2016 |
| WO | 2000/062106 A1 | 10/2000 |
| WO | 2009/107260 A1 | 9/2009 |
| WO | 2015/190533 A1 | 12/2015 |
| WO | 2016/031901 A1 | 3/2016 |

OTHER PUBLICATIONS

Office Action issued in corresponding Japanese Patent Application No. 2017-522689 dated Aug. 1, 2017 (3 pages).

Office Action issued in corresponding Japanese Patent Application No. 2017-522689 dated Nov. 28, 2017 (2 pages).

Decision to Decline the Amendment issued in corresponding Japanese Patent Application No. 2017-522689 dated Mar. 27, 2018 (2 pages).

Decision to Grant a Patent issued in corresponding application No. JP2018-012001 dated Apr. 23, 2019 (5 pages).

* cited by examiner

OPTICAL FIBER AND METHOD FOR MANUFACTURING SAME

TECHNICAL FIELD

The present invention relates to an optical fiber that includes a depressed layer. The present invention further relates to a method of producing such an optical fiber.

BACKGROUND ART

In order to achieve an optical communication system that enables long-distance transmission, it is desirable to increase the power of optical signals as well as reducing transmission loss of the optical fiber, which is a transmission medium, and thereby improving optical signal-to-noise ratio. However, an increase in power of an optical signal causes a deterioration of optical signal-to-noise ratio because of a nonlinear optical effect in the optical fiber. An often used method to address this is to suppress the nonlinear optical effect by increasing the effective core area Aeff of the optical fiber.

However, an increase in effective core area Aeff is associated with a side effect that increases microbending loss. Therefore, in regard to an optical fiber for long-distance transmission, in which loss needs to be kept small when the optical fiber is used in the form of a cable, it is necessary to make some arrangement to prevent or reduce an increase in microbending loss that would be caused by an increase in effective core area Aeff.

Patent Literature 1 discloses a technique to prevent or reduce an increase in microbending loss that would be caused by an increase in effective core area Aeff, by selecting optimal Young's modulus and thickness of a coating layer.

CITATION LIST

Patent Literature

[Patent Literature 1]

Pamphlet of International Publication No. WO 2000/062106 (International Publication Date: Oct. 19, 2000)

However, merely selecting optimal Young's modulus and thickness of a coating layer in accordance with Patent Literature 1 is not enough to maintain the microbending loss of the optical fiber at a level that can withstand long-distance transmission. For example, in regard to an optical fiber to be housed within a ribbon slotted cable, the microbending loss of the optical fiber is difficult to maintain at a level that can withstand long-distance transmission.

SUMMARY

One or more embodiments of this disclosure provide an optical fiber in which microbending loss is suppressed by optimizing a refractive index profile which has been ignored in Patent Literature 1.

An optical fiber in accordance with one or more embodiments includes: a core; a cladding layer that is lower in refractive index than the core; and a depressed layer that lies between the core and the cladding layer and that is lower in refractive index than the cladding layer, the optical fiber having an effective core area Aeff that is equal to or greater than 100 $\mu m^2$ and equal to or less than 129 $\mu m^2$, the core having a radius r1 that is equal to or greater than 5.2 $\mu m$ and equal to or less than 7.4 $\mu m$, the core having a refractive index volume Vcore that is equal to or greater than 8.5% $\mu m^2$ and equal to or less than 16.5% $\mu m^2$, the depressed layer having a refractive index volume Vdep that is equal to or greater than −40% $\mu m^2$ and less than 0 $\mu m^2$.

A production method in accordance with one or more embodiments is a method of producing an optical fiber that includes: a core; a cladding layer that is lower in refractive index than the core; and a depressed layer that lies between the core and the cladding layer and that is lower in refractive index than the cladding layer, the optical fiber having a propagation constant difference $\Delta\beta$ equal to or greater than a predetermined value $\Delta\beta0$ [rad/m], the method comprising a step of determining a refractive index profile of the optical fiber such that: (a) an effective core area Aeff of the optical fiber is equal to or greater than 100 [$\mu m^2$] and equal to or less than (16650 [rad/m]−$\Delta\beta0$ [rad/m])/63.2 [(rad/m)·(1/$\mu m^2$)]; (b) a radius r1 of the core is equal to or greater than (9329 [rad/m]+$\Delta\beta0$ [rad/m])/3429 [(rad/m)/$\mu m$] and equal to or less than (21180 [rad/m]−$\Delta\beta0$ [rad/m])/1714 [(rad/m)/$\mu m$]; (c) a refractive index volume Vcore of the core is equal to or greater than (−655 [rad/m]+$\Delta\beta0$ [rad/m])/923 [(rad/m)/(% $\mu m^2$)] and equal to or less than (16420 [rad/m]−$\Delta\beta0$ [rad/m])/480 [(rad/m)/(% $\mu m^2$)]; and (d) a refractive index volume Vdep of the depressed layer is equal to or greater than (−13300 [rad/m]+$\Delta\beta0$ [rad/m])/120 [(rad/m)/(% $\mu m^2$)] and less than 0 [$\mu m^2$].

According to one or more embodiments of the present invention, it is possible to obtain an optical fiber in which microbending loss is suppressed.

DETAILED DESCRIPTION

[Configuration of Optical Fiber]

Figure 1:
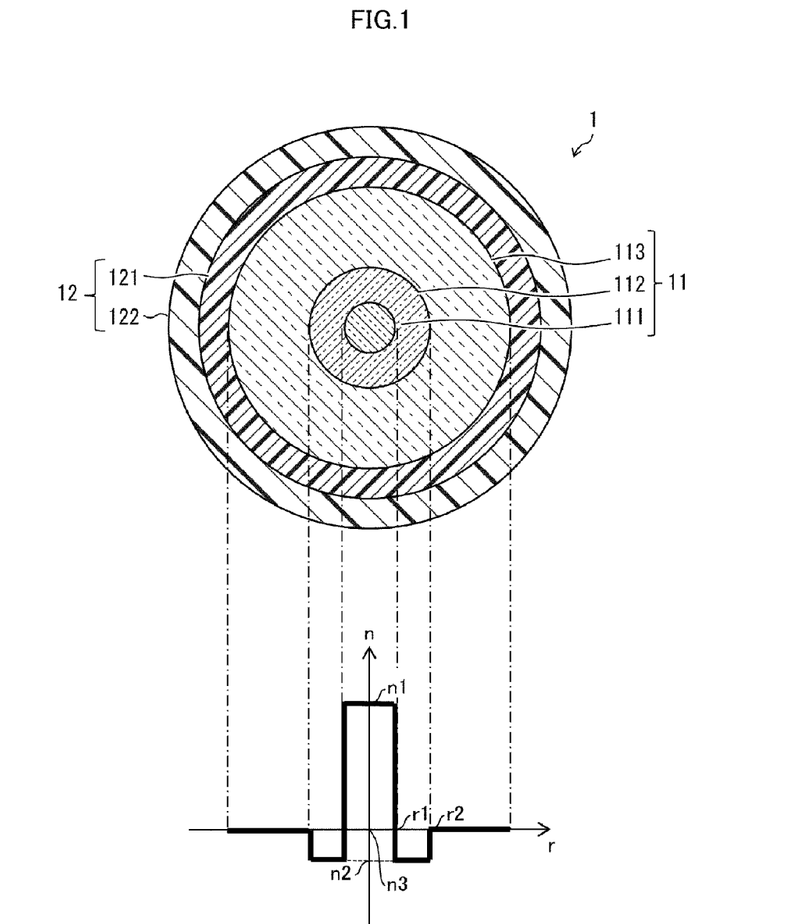
FIG. 1, which is about an optical fiber in accordance with one or more embodiments, is a combination of a cross-sectional view illustrating a configuration of the optical fiber and a graph showing a refractive index profile of the optical fiber.

The following description will discuss an optical fiber in accordance with one or more embodiments with reference to FIG. 1. The upper portion of FIG. 1 is a cross-sectional view illustrating a configuration of an optical fiber 1, and is a graph showing a refractive index profile of the optical fiber 1.

The optical fiber 1 includes: an element wire part 11 in the shape of a circular rod; and a coating part 12 that covers the side face of the element wire part 11 and that is in the shape of a circular tube. The element wire part 11 is constituted by: a core 111 in the shape of a circular rod; a depressed layer 112 that covers the side face of the core 111 and that is in the shape of a circular tube; and a cladding layer 113 that covers the outer surface of the depressed layer 112 and that is in the shape of a circular tube. The coating part 12 is constituted by; a primary coating layer 121 that covers the outer surface of the cladding layer 113 and that is in the shape of a circular tube; and a secondary coating layer 122 that covers the outer surface of the primary coating layer 121 and that is in the shape of a circular tube. The element wire part 11 is equal to or greater than 100 μm and equal to or less than 125 μm in outer diameter (diameter), the primary coating layer 121 is equal to or greater than 130 μm and equal to or less than 250 μm in outer diameter (diameter), and the secondary coating layer 122 is equal to or greater than 160 μm and equal to or less than 400 μm in outer diameter (diameter).

The element wire part 11 of the optical fiber 1 contains silica ($SiO_2$) glass as a main component. The core 111, the depressed layer 112, and the cladding layer 113, which constitute the element wire part 11, are distinct from each other by differences in refractive index. Specifically, a refractive index n1 of the core 111 is higher than a refractive index n3 of the cladding layer 113, and a refractive index n2 of the depressed layer 112 is lower than the refractive index n3 of the cladding layer 113. The optical fiber 1 may be a germanium core optical fiber or may be a silica core optical fiber. In the former case, germanium (Ge) is added to the core 111 so that the refractive index increases, and fluorine (F) is added to the depressed layer 112 so that the refractive index decreases. In this case, the cladding layer 113 is composed of silica glass. In the latter case, high-concentration fluorine is added to the depressed layer 112 so that the refractive index greatly decreases, and low-concentration fluorine is added to the cladding layer 113 so that the refractive index decreases to a small extent. In this case, the core 111 is composed of silica glass to which no germanium has been added.

In the following descriptions, the radius of the core 111 (a distance from the central axis of the optical fiber 1 to the side face of the core 111) is referred to as r1, and the outer radius of the depressed layer 112 (a distance from the central axis of the optical fiber 1 to the outer surface of the depressed layer 112) is referred to as r2. Furthermore, a relative refractive index difference of the refractive index n1 of the core 111 relative to the refractive index n3 of the cladding layer 113 is represented by 100×(n1−n3)/n3 and referred to as Δ1 (positive value in %), and a relative refractive index difference of the refractive index n2 of the depressed layer 112 relative to the refractive index n3 of the cladding layer 113 is represented by 100×(n2−n3)/n3 and referred to as Δ2 (negative value in %). Exemplary values of these structural constants that determine the refractive index profile of the optical fiber 1 will be described later.

The coating part 12 of the optical fiber 1 is formed from an ultraviolet curable resin. The primary coating layer 121 and the secondary coating layer 122, which constitute the coating part 12, are distinct from each other by differences in Young's modulus. Specifically, the Young's modulus of the secondary coating layer 122 is higher than the Young's modulus of the primary coating layer 121. For example, with an arrangement in which the Young's modulus of the primary coating layer 121 is equal to or less than 1 MPa and the Young's modulus of the secondary coating layer 122 is equal to or more than 500 MPa, it is possible to obtain an optical fiber 1 that has a large effective core area and that achieves small microbending loss. Examples of an ultraviolet curable resin usable as a material for the coating part 12 include ultraviolet curable resins such as urethane acrylate-based ultraviolet curable resins, polybutadiene acrylate-based ultraviolet curable resins, epoxy acrylate-based ultraviolet curable resins, silicone acrylate-based ultraviolet curable resins, and polyester acrylate-based ultraviolet curable resins.

[Propagation Constant Difference Δβ]

In this specification, attention is focused on a propagation constant difference Δβ of an optical fiber, which is a parameter that controls microbending loss. As used herein, the term "propagation constant difference Δβ" refers to a difference between a propagation constant of a propagation mode and a propagation constant of a radiation mode. A larger propagation constant difference Δβ results in greater difficulty in coupling of the propagation mode to the radiation mode, resulting in less occurrence of microbending loss. The propagation constant difference Δβ can be calculated by a finite element method from the structural constants r1, r2, Δ1, and Δ2 which determine the refractive index profile of the optical fiber.

The propagation constant difference Δβ may be equal to or greater than 8500 rad/m, may also be equal to or greater than 9700 rad/m. The reason why the propagation constant difference Δβ may be equal to or greater than 8500 rad/m is that, otherwise (if the propagation constant difference Δβ is less than 8500 rad/m), an increase in transmission loss at a wavelength of 1550 nm, which would occur when the optical cable is housed in a standard ribbon slotted cable, would exceed 0.01 dB/km in many cases. The reason why the propagation constant difference Δβ may also be equal to or greater than 9700 rad/m is that, with such a value (if the propagation constant difference Δβ is equal to or greater than 9700 rad/m), an increase in transmission loss at a wavelength of 1550 nm, which would occur when the optical cable is housed in a standard ribbon slotted cable, would not exceed 0.002 dB/km and this is ignorable. Furthermore, an optical fiber in which the propagation constant difference Δβ is equal to or greater than 9700 rad/m keeps the transmission loss small even when housed in a small-diameter ribbon slotted cable, and thus can be suitably used also in a small-diameter ribbon slotted cable. It should be noted that the reason why the lower limit of the propagation constant differences Δβ is higher in a case of an optical fiber that is housed in a small-diameter ribbon slotted cable is that a lateral pressure imposed on this optical fiber is larger than an optical fiber housed in a standard ribbon slotted cable.

The inventors of the present application have found that, among the foregoing various parameters that characterize the refractive index profile of the optical fiber 1, especially the following four parameters are significantly correlated to the propagation constant difference Δβ: (a) effective core area Aeff; (b) radius r1 of the core 111; (c) refractive index volume Vcore of the core 111; and (d) refractive index volume Vdep of the depressed layer 112. As used herein, the term "effective core area Aeff" refers to an optically effective cross-sectional area of the core 111, and is defined by the following equation (1). In the following equation (1), E represents the electric field intensity of propagating light at a point distanced from the central axis of the core 111 by r. The refractive index volumes Vcore and the Vdep are defined by the following equations (2) and (3), respectively.

$$A_{eff} = 2\pi (\int_0^\infty E^2 r\, dr)^2 / (\int_0^\infty E^4 r\, dr) \qquad (1)$$

$$V_{core} = \Delta 1 \times r1^2 \qquad (2)$$

$$V_{dep} = \Delta 2 \times (r2^2 - r1^2) \qquad (3)$$

The following description considers conditions imposed on the above four parameters in order to achieve a propagation constant difference $\Delta\beta$ that is equal to or greater than a predetermined value $\Delta\beta 0$ [rad/m], particularly conditions imposed on the above four parameters in order to achieve a propagation constant difference $\Delta\beta$ that is equal to or greater than 8500 rad/m or a propagation constant difference $\Delta\beta$ that is equal to or greater than 9700 rad/m.

[Effective Core Area Aeff]

Figure 2:
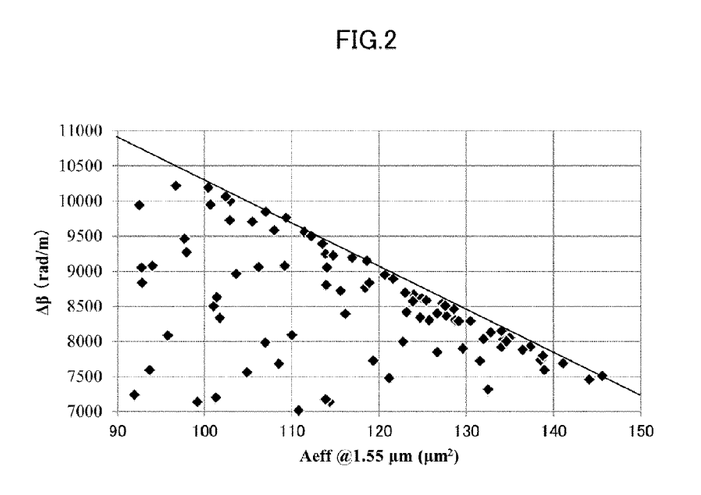
FIG. 2, which is about the optical fiber illustrated in FIG. 1, is a graph showing a correlation between propagation constant difference $\Delta\beta$ and effective core area Aeff.

FIG. 2 is a graph showing a correlation between effective core area Aeff at a wavelength of 1.55 μm and propagation constant difference $\Delta\beta$. The graph shown in FIG. 2 was obtained by: numerically calculating the value [μm$^2$] of effective core area Aeff and the value [rad/m] of propagation constant difference $\Delta\beta$ of each of 100 or more kinds of refractive index profile that the optical fiber 1 can have; and plotting pairs of the obtained values as points.

The graph shown in FIG. 2 demonstrates that the propagation constant difference $\Delta\beta$ of an optical fiber 1 that has a certain effective core area Aeff is at or below an upper limit $\Delta\beta$max calculated from that effective core area Aeff (the upper limit is represented by $\Delta\beta$max [rad/m]=16650 [rad/m]−63.2 [(rad/m)·(1/μm$^2$)]×Aeff [μm$^2$], corresponding to the solid straight line in FIG. 2) when that effective core area Aeff is equal to or greater than 100 [μm$^2$].

Therefore, in order for the propagation constant difference $\Delta\beta$ to be equal to or greater than a predetermined value $\Delta\beta 0$ [rad/m], it is necessary that the effective core area Aeff be equal to or greater than 100 [μm$^2$] and equal to or less than (16650 [rad/m]−$\Delta\beta 0$ [rad/m])/63.2 [(rad/m)·(1/μm$^2$)]. Conversely, in a case where the effective core area Aeff is equal to or greater than 100 [μm$^2$] and equal to or less than (16650 [rad/m]−$\Delta\beta 0$ [rad/m])/63.2 [(rad/m)·(1/μm$^2$)], a propagation constant difference $\Delta\beta$ that is equal to or greater than the predetermined value $\Delta\beta 0$ can be achieved by selecting appropriate values of the structural constants r1, r2, $\Delta$1, and $\Delta$2.

For example, in order for the propagation constant difference $\Delta\beta$ to be equal to or greater than certain 8500 [rad/m], it is necessary that the effective core area Aeff [μm$^2$] be equal to or greater than 100 [μm$^2$] and equal to or less than (16650 [rad/m]−8500 [rad/m])/63.2 [(rad/m)·(1/μm$^2$)]≈129 [μm$^2$]. Conversely, in a case where the effective core area Aeff is equal to or greater than 100 [μm$^2$] and equal to or less than 129 [μm$^2$], it is possible to achieve a propagation constant difference $\Delta\beta$ that is equal to or greater than 8500 [rad/m] by selecting appropriate values of the structural constants r1, r2, $\Delta$1, and $\Delta$2.

In order for the propagation constant difference $\Delta\beta$ to be equal to or greater than certain 9700 [rad/m], it is necessary that the effective core area Aeff [μm$^2$] be equal to or greater than 100 [μm$^2$] and equal to or less than (16650 [rad/m]−9700 [rad/m])/63.2 [(rad/m)·(1/μm$^2$)]≈110 [μm$^2$]. Conversely, in a case where the effective core area Aeff is equal to or greater than 100 [μm$^2$] and equal to or less than 110 [μm$^2$], it is possible to achieve a propagation constant difference $\Delta\beta$ that is equal to or greater than 9700 [rad/m] by selecting appropriate values of the structural constants r1, r2, $\Delta$1, and $\Delta$2.

[Radius r1 of Core]

Figure 3:
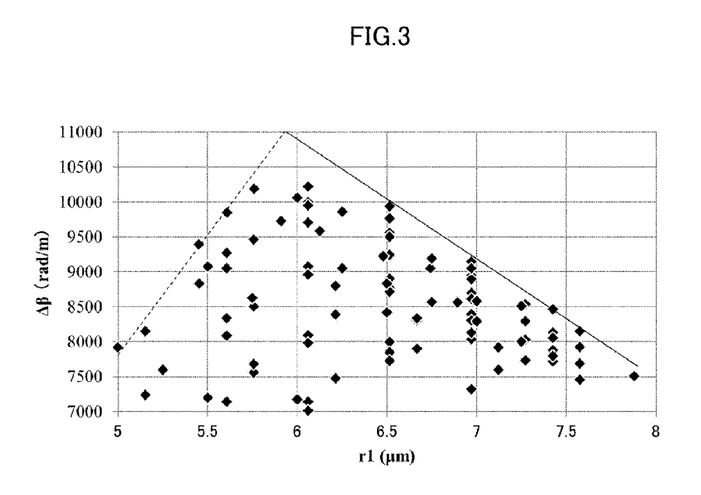
FIG. 3, which is about the optical fiber illustrated in FIG. 1, is a graph showing a correlation between propagation constant difference $\Delta\beta$ and radius r1 of a core.

FIG. 3 is a graph showing a correlation between the radius r1 of the core 111 and propagation constant difference $\Delta\beta$. The graph shown in FIG. 3 was obtained by: numerically calculating the value of radius r1 and the value [rad/m] of propagation constant difference $\Delta\beta$ of each of 100 or more kinds of refractive index profile that the optical fiber 1 can have; and plotting pairs of the obtained values as points.

The graph shown in FIG. 3 demonstrates that the propagation constant difference $\Delta\beta$ of an optical fiber 1 whose core 111 has a certain radius r1 is (1) at or below an upper limit $\Delta\beta$max (represented by $\Delta\beta$max [rad/m]=−9329 [rad/m]+3429 [(rad/m)/μm]×r1 [μm], corresponding to the dashed straight line shown in FIG. 3) when r1<5.9 [μm] and (2) at or below an upper limit $\Delta\beta$max (represented by $\Delta\beta$max [rad/m]=21180 [rad/m]−1714 [(rad/m)/μm]×r1 [μm], corresponding to the solid straight line in FIG. 3) when r≥5.9 [μm].

Therefore, in order for the propagation constant difference $\Delta\beta$ to be equal to or greater than a predetermined value $\Delta\beta 0$ [rad/m], it is necessary that the radius r1 be equal to or greater than (9329 [rad/m]+$\Delta\beta 0$ [rad/m])/3429 [(rad/m)/μm] and equal to or less than (21180 [rad/m]−$\Delta\beta 0$ [rad/m])/1714 [(rad/m)/μm]. Conversely, in a case where the radius r1 is equal to or greater than (9329 [rad/m]+$\Delta\beta 0$ [rad/m])/3429 [(rad/m)/μm] and equal to or less than (21180 [rad/m]−$\Delta\beta 0$ [rad/m])/1714 [(rad/m)/μm], it is possible to achieve a propagation constant difference $\Delta\beta$ that is equal to or greater than the predetermined value $\Delta\beta 0$ by selecting appropriate values of the structural constants r1, r2, $\Delta$1, and $\Delta$2.

For example, in order for the propagation constant difference $\Delta\beta$ to be equal to or greater than certain 8500 [rad/m], it is necessary that the radius r1 be equal to or greater than (9329 [rad/m]+8500 [rad/m])/3429 [(rad/m)/μm]≈5.2 [μm] and equal to or less than (21180 [rad/m]−8500 [rad/m])/1714 [(rad/m)/μm]≈7.4 [μm]. Conversely, in a case where the radius r1 is equal to or greater than 5.2 [μm] and equal to or less than 7.4 [μm], it is possible to achieve a propagation constant difference $\Delta\beta$ that is equal to or greater than 8500 [rad/m] by selecting appropriate values of the structural constants r1, r2, $\Delta$1, and $\Delta$2.

In order for the propagation constant difference $\Delta\beta$ to be equal to or greater than certain 9700 [rad/m], it is necessary that the radius r1 be equal to or greater than (9329 [rad/m]+9700 [rad/m])/3429 [(rad/m)/μm]≈5.55 [μm] and equal to or less than (21180 [rad/m]−9700 [rad/m])/1714 [(rad/m)/μm]≈6.7 [μm]. Conversely, in a case where the radius r1 is equal to or greater than 5.55 [μm] and equal to or less than 6.7 [μm], it is possible to achieve a propagation constant difference $\Delta\beta$ that is equal to or greater than 9700 [rad/m] by selecting appropriate values of the structural constants r1, r2, $\Delta$1, and $\Delta$2.

[Refractive Index Volume Vcore of Core]

Figure 4:
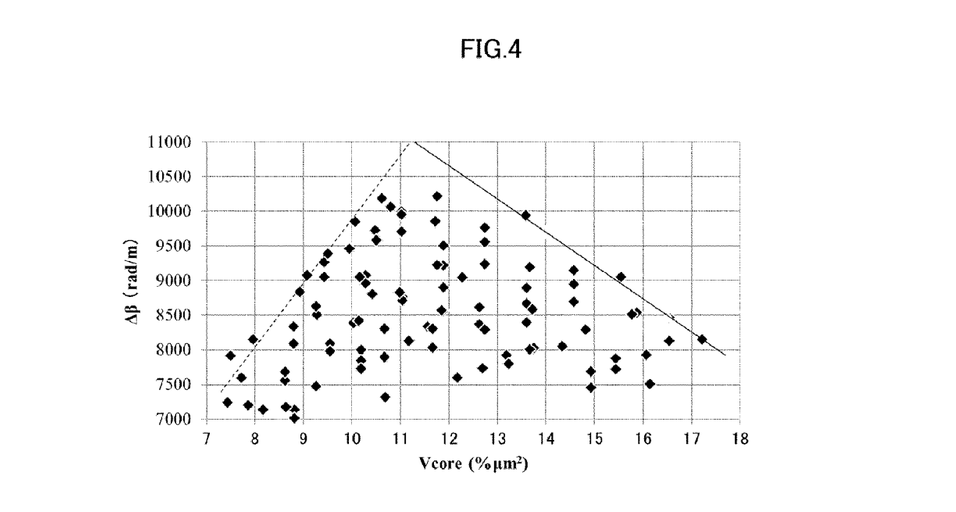
FIG. 4, which is about the optical fiber illustrated in FIG. 1, is a graph showing a correlation between propagation constant difference $\Delta\beta$ and refractive index volume Vcore of the core.

FIG. 4 is a graph showing a correlation between the refractive index volume Vcore of the core 111 and propagation constant difference $\Delta\beta$. The graph shown in FIG. 4 was obtained by: numerically calculating the value of refractive index volume Vcore and the value [rad/m] of propagation constant difference $\Delta\beta$ of each of 100 or more kinds of refractive index profile that the optical fiber 1 can have; and plotting pairs of the obtained values as points.

The graph shown in FIG. 4 demonstrates that the propagation constant difference $\Delta\beta$ of an optical fiber 1 whose core 111 has a certain refractive index volume Vcore is (1) at or below an upper limit $\Delta\beta$max (represented by $\Delta\beta$max [rad/m]=655 [rad/m]+923 [(rad/m)/(% μm$^2$)]×Vcore [% μm$^2$], corresponding to the dashed straight line shown in FIG. 4) when Vcore<11.2 [% μm$^2$] and (2) at or below an upper limit $\Delta\beta$max (represented by $\Delta\beta$max [rad/m]=16420 [rad/m]−480 [(rad/m)/(% μm$^2$)]×Vcore [% μm$^2$], corresponding to the solid straight line in FIG. 4) when r≥11.2 [% μm$^2$].

Therefore, in order for the propagation constant difference $\Delta\beta$ to be equal to or greater than a predetermined value $\Delta\beta 0$ [rad/m], it is necessary that the refractive index volume Vcore be equal to or greater than (−655 [rad/m]+$\Delta\beta 0$ [rad/m])/923 [(rad/m)/(% μm$^2$)] and equal to or less than (16420 [rad/m]−Δβ0 [rad/m])/480 [(rad/m)/(% μm$^2$)]. Conversely, in a case where the refractive index volume Vcore is equal to or greater than (−655 [rad/m]+Δβ0 [rad/m])/923 [(rad/m)/(% μm$^2$)] and equal to or less than (16420 [rad/m]−Δβ0 [rad/m])/480 [(rad/m)/(% μm$^2$)], it is possible to achieve a propagation constant difference Δβ that is equal to or greater than the predetermined value Δβ0 by selecting appropriate values of the structural constants r1, r2, Δ1, and Δ2.

For example, in order for the propagation constant difference Δβ to be equal to or greater than certain 8500 [rad/m], it is necessary that the refractive index volume Vcore be equal to or greater than (−655 [rad/m]+8500 [rad/m])/923 [(rad/m)/(% μm$^2$)]≈8.5 [% μm$^2$] and equal to or less than (16420 [rad/m]−8500 [rad/m])/480 [(rad/m)/(% μm$^2$)]≈16.5 [% μm$^2$]. Conversely, in a case where the refractive index volume Vcore is equal to or greater than 8.5 [% μm$^2$] and equal to or less than 16.5 [% μm$^2$], it is possible to achieve a propagation constant difference Δβ that is equal to or greater than 8500 [rad/m] by selecting appropriate values of the structural constants r1, r2, Δ1, and Δ2.

In order for the propagation constant difference Δβ to be equal to or greater than certain 9700 [rad/m], it is necessary that the refractive index volume Vcore be equal to or greater than (−655 [rad/m]+9700 [rad/m])/923 [(rad/m)/(% μm$^2$)]≈ 9.8 [% μm$^2$] and equal to or less than (16420 [rad/m]−9700 [rad/m])/480 [(rad/m)/(% μm$^2$)]≈14 [% μm$^2$]. Conversely, in a case where the refractive index volume Vcore is equal to or greater than 9.8 [% μm$^2$] and equal to or less than 14 [% μm$^2$], it is possible to achieve a propagation constant difference Δβ that is equal to or greater than 9700 [rad/m] by selecting appropriate values of the structural constants r1, r2, Δ1, and Δ2.

[Refractive Index Volume Vdep of Depressed Layer]

Figure 5:
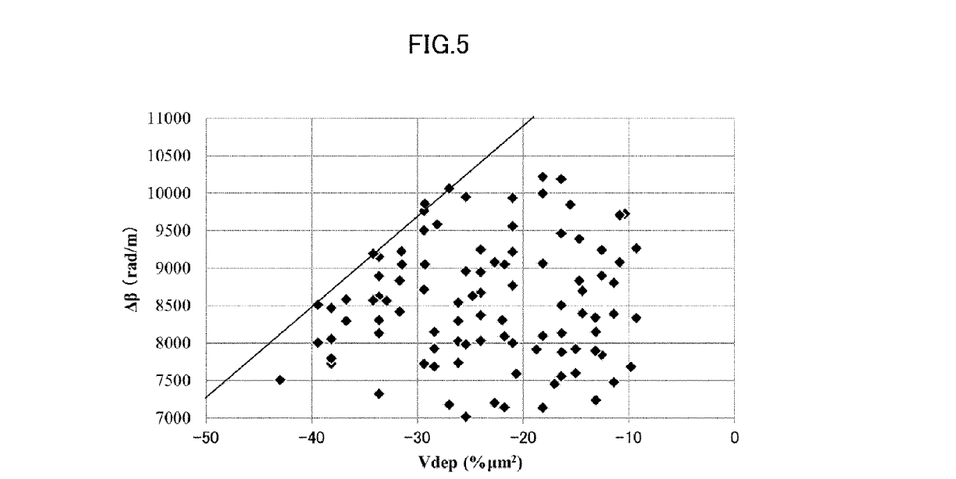
FIG. 5, which is about the optical fiber illustrated in FIG. 1, is a graph showing a correlation between propagation constant difference $\Delta\beta$ and refractive index volume Vdep of a depressed layer.

FIG. 5 is a graph showing a correlation between the refractive index volume Vdep of the depressed layer 112 and propagation constant difference Δβ. The graph shown in FIG. 5 was obtained by: numerically calculating the value of refractive index volume Vdep and the value [rad/m] of propagation constant difference Δβ of each of 100 or more kinds of refractive index profile that the optical fiber 1 can have; and plotting pairs of the obtained values as points.

The graph shown in FIG. 5 demonstrates that the propagation constant difference Δβ of an optical fiber 1 whose depressed layer 112 has a certain refractive index volume Vdep is at or below an upper limit Δβmax (represented by Δβmax [rad/m]=13300 [rad/m]+120 [(rad/m)/(% μm$^2$)]× Vdep [% μm$^2$], corresponding to the solid straight line in FIG. 5) when the refractive index volume Vdep is less than 0 [% μm$^2$].

Therefore, in order for the propagation constant difference Δβ to be equal to or greater than a predetermined value Δβ0 [rad/m], it is necessary that the refractive index volume Vdep be equal to or greater than (−13300 [rad/m]+Δβ0 [rad/m])/120 [(rad/m)/(% μm$^2$)] and less than 0 [% μm$^2$]. Conversely, in a case where the refractive index volume Vdep is equal to or greater than (−13300 [rad/m]+Δβ0 [rad/m])/120 [(rad/m)/(% μm$^2$)] and less than 0 [% μm$^2$], it is possible to achieve a propagation constant difference Δβ that is equal to or greater than the predetermined value Δβ0 by selecting appropriate values of the structural constants r1, r2, Δ1, and Δ2.

For example, in order for the propagation constant difference Δβ to be equal to or greater than certain 8500 [rad/m], it is necessary that the refractive index volume Vdep be equal to or greater than (−13300 [rad/m]+8500 [rad/m])/120 [(rad/m)/(% μm$^2$)]=−40 [% μm$^2$] and less than 0 [% μm$^2$]. Conversely, in a case where the refractive index volume Vdep is equal to or greater than −40 [% μm$^2$] and less than 0 [% μm$^2$], it is possible to achieve a propagation constant difference Δβ that is equal to or greater than 8500 [rad/m] by selecting appropriate values of the structural constants r1, r2, Δ1, and Δ2.

In order for the propagation constant difference Δβ to be equal to or greater than certain 9700 [rad/m], it is necessary that the refractive index volume Vdep be equal to or greater than (−13300 [rad/m]+9700 [rad/m])/120 [(rad/m)/(% μm$^2$)]=−30 [% μm$^2$] and less than 0 [% μm$^2$]. Conversely, in a case where the refractive index volume Vdep is equal to or greater than −30 [% μm$^2$] and less than 0 [% μm$^2$], it is possible to achieve a propagation constant difference Δβ that is equal to or greater than 9700 [rad/m] by selecting appropriate values of the structural constants r1, r2, Δ1, and Δ2.

[Summary of the Results of Consideration]

The following conclusions are derived from the above considerations.

That is, in order for the propagation constant difference Δβ to be equal to or greater than a predetermined value Δβ0, it is only necessary that the values of structural constants r1, r2, Δ1, and Δ2 be selected such that the four parameters, that is, (a) the effective core area Aeff [μm$^2$], (b) the radius r1 [μm] of the core 111, (c) the refractive index volume Vcore [% μm$^2$] of the core 111, and (d) the volume ratio of refractive index Vdep [% μm$^2$] of the depressed layer 112, satisfy the following conditions. It should be noted that the units of the quantities in the following conditions are as described earlier.

(a) 100≤Aeff≤(16650−Δβ0)/63.2
(b) (9329+Δβ0)/3429≤r1≤(21180−Δβ0)/1714
(c) (−655+Δβ0)/923 Vcore (16420−Δβ0)/480
(d) (−13300+Δβ0)/120≤Vdep<0

For example, in order for the propagation constant difference Δβ to be equal to or greater than 8500 [rad/m], it is only necessary that the values of the structural constants r1, r2, Δ1, and Δ2 be selected such that the above four parameters satisfy the following conditions.

(a1) 100≤Aeff≤129 μm$^2$
(b1) 5.2 μm≤r1≤7.4 μm
(c1) 8.5% μm$^2$≤Vcore≤16.5% μm$^2$
(d1) −40% μm$^2$≤Vdep<0 μm$^2$ In this case, the values of the Δ1, Δ2, and r2/r1 may be selected from the following ranges, for example.

(e1) 0.26%≤Δ1≤0.34%
(f1) −0.07%≤Δ2≤−0.03%
(g1) 3.2≤r2/r1≤4.0

Alternatively, the values of the Δ1, Δ2, and r2/r1 may be selected from the following ranges.

(e1') 0.26%≤Δ1≤0.35%
(f1') −0.07%≤Δ2≤−0.002%
(g1') 2.8≤r2/r1≤4.0

On the other hand, in order for the propagation constant difference Δβ to be equal to or greater than 9700 [rad/m], it is only necessary that the values of the structural constants r1, r2, Δ1, and Δ2 be selected such that the above four parameters satisfy the following conditions.

(a2) 100≤Aeff≤110 μm$^2$
(b2) 5.55 μm≤r1≤6.7 μm
(c2) 9.8% μm$^2$≤Vcore≤14% μm$^2$
(d2) −30% μm$^2$≤Vdep<0 μm$^2$ In this case, the values of the Δ1, Δ2, and r2/r1 may be selected from the following ranges, for example.

(e2) 0.26%≤Δ1≤0.34%
(f2) −0.07%≤Δ2≤−0.03%
(g2) 3.2≤r2/r1≤4.0

Alternatively, the values of the Δ1, Δ2, and r2/r1 may be selected from the following ranges.

(e2') 0.26%≤Δ1≤0.35%

(f2') −0.07% Δ→2≤−0.002%

(g2') 2.8≤r2/r1≤4.0

In every case, the effective core area Aeff may be equal to or greater than 100 μm. The chromatic dispersion may also be equal to or greater than 18 ps/nm/km and is 23 ps/nm/km. The loss at a wavelength of 1.55 μm may also be equal to or less than 0.185 dB/km. The cutoff wavelength λcc is equal to or greater than 1.35 nm and equal to or less than 1.53 nm. With this, various conditions that should be met by an optical fiber for long-distance transmission can be satisfied.

It should be noted that, in a case where the optical fiber 1 is a germanium core optical fiber, Δ1 May be equal to or less than 0.33%. This is because, if Δ1 is increased to more than 0.33% by adding germanium to the core 111, the loss at a wavelength of 1.55 μm may exceed 0.185 dB/km due to Rayleigh scattering caused by germanium.

On the other hand, in a case where the optical fiber 1 is a silica core optical fiber, Rayleigh scattering due to germanium does not occur, and therefore the loss at a wavelength of 1.55 μm can be suppressed to 0.175 dB/km or below. In this case, the chlorine concentration of the core 111 may be equal to or more than 0.2 wt % and equal to or less than 2.0 wt %. This is because, if a suitable amount of chlorine is added to silica glass, oxygen excess defects and oxygen deficient defects are reduced and an increase in transmission loss can be prevented or reduced.

EXAMPLES

Silica core optical fibers A to E, a germanium core optical fiber F, and silica core optical fibers G to J were produced as examples of the optical fiber 1, and evaluated for their characteristics. The optical fibers A to J were such that the outer diameter of the element wire part 11 was 125 μm, the outer diameter of the primary coating layer 121 was 190 μm, and the outer diameter (diameter) of the secondary coating layer 122 was 241 μm. A material for the primary coating layer 121 was an acrylate-based ultraviolet curable resin having a Young's modulus of 0.54 MPa, and a material for the secondary coating layer 122 was an acrylate-based ultraviolet curable resin having a Young's modulus of 600 MPa.

Tables 1 to 3 below show the results. Table 1 shows the structural constants Δ1, Δ2, r1, r2, and r2/r1 of the optical fibers A to J. Table 2 shows the refractive index volumes Vcore and Vdep, volume ratio of refractive index Vdep/Vcore, cutoff wavelength λcc, and effective core area Aeff of the optical fibers A to J. Table 3 shows mode field diameter (MFD), chromatic dispersion, loss, propagation constant difference Δβ, and SP loss increase of the optical fibers A to J. The values of the cutoff wavelength λcc, effective core area Aeff, chromatic dispersion, loss, propagation constant difference Δβ, and SP loss increase are each an actually measured value at a wavelength of 1.55 μm. The optical fibers A to J are examples in which the propagation constant difference Δβ is equal to or greater than 8500 [rad/m]. Especially the optical fibers A and E are examples in which the propagation constant difference Δβ is equal to or greater than 9700 [rad/m].

TABLE 1

|  | Δ1[%] | Δ2[%] | r1[μm] | r2[μm] | r2/r1 |
|---|---|---|---|---|---|
| Optical Fiber A | 0.31 | −0.03 | 5.9 | 19.2 | 3.3 |
| Optical Fiber B | 0.29 | −0.06 | 6.5 | 21.4 | 3.3 |
| Optical Fiber C | 0.32 | −0.04 | 6.5 | 20.8 | 3.2 |
| Optical Fiber D | 0.29 | −0.05 | 6.1 | 20.8 | 3.4 |
| Optical Fiber E | 0.31 | −0.05 | 6.1 | 20.8 | 3.4 |
| Optical Fiber F | 0.30 | −0.06 | 6.1 | 19.2 | 3.2 |
| Optical Fiber G | 0.28 | −0.03 | 5.5 | 18.2 | 3.3 |
| Optical Fiber H | 0.30 | −0.05 | 7.4 | 24.5 | 3.3 |
| Optical Fiber I | 0.30 | −0.07 | 7.4 | 24.5 | 3.3 |
| Optical Fiber J | 0.34 | 0.00 | 5.9 | 20.2 | 3.4 |

TABLE 2

|  | Vcore [% μm$^2$] | Vdep [% μm$^2$] | Vdep/Vcore | λcc [μm] | Aeff [μm$^2$] |
|---|---|---|---|---|---|
| Optical Fiber A | 10.6 | −11.0 | −1.0 | 1.39 | 105.3 |
| Optical Fiber B | 12.2 | −22.9 | −1.9 | 1.45 | 120.2 |
| Optical Fiber C | 13.4 | −15.6 | −1.2 | 1.51 | 115.3 |
| Optical Fiber D | 10.9 | −19.8 | −1.8 | 1.46 | 109.8 |
| Optical Fiber E | 11.6 | −19.8 | −1.7 | 1.37 | 106.8 |
| Optical Fiber F | 11.0 | −19.2 | −1.8 | 1.50 | 114.2 |
| Optical Fiber G | 8.5 | −7.5 | −0.9 | 1.33 | 102.3 |
| Optical Fiber H | 16.5 | −27.3 | −1.6 | 1.78 | 129.6 |
| Optical Fiber I | 16.5 | −40.0 | −2.4 | 1.72 | 128.3 |
| Optical Fiber J | 11.8 | −0.9 | −0.2 | 1.42 | 110.8 |

TABLE 3

|  | MFD [μm] | Chromatic dispersion [ps/nm/km] | Loss [dB/km] | Δβ [rad/m] | SP loss increase [dB/km] |
|---|---|---|---|---|---|
| Optical Fiber A | 11.4 | 19.9 | 0.167 | 9814 | 0.18 |
| Optical Fiber B | 12.1 | 20.9 | 0.168 | 9049 | 0.43 |
| Optical Fiber C | 11.8 | 20.8 | 0.168 | 9559 | 0.17 |
| Optical Fiber D | 11.7 | 20.2 | 0.168 | 9573 | 0.37 |
| Optical Fiber E | 11.5 | 20.2 | 0.169 | 9781 | 0.25 |
| Optical Fiber F | 11.7 | 20.3 | 0.178 | 9411 | 0.33 |
| Optical Fiber G | 11.38 | 18.78 | 0.169 | 8562 | 0.44 |
| Optical Fiber H | 12.72 | 20.94 | 0.169 | 8571 | 0.48 |
| Optical Fiber I | 12.36 | 21.08 | 0.168 | 8503 | 0.50 |

TABLE 3-continued

|  | MFD [μm] | Chromatic dispersion [ps/nm/km] | Loss [dB/km] | Δβ [rad/m] | SP loss increase [dB/km] |
|---|---|---|---|---|---|
| Optical Fiber J | 11.69 | 20.23 | 0.168 | 9626 | 0.36 |

As used herein, the term "SP loss increase" refers to an increase in transmission loss (loss increase) determined by a sandpaper (SP) tension-wind test, which is one of the methods for evaluating microbending loss. In a case where the value of SP loss increase is equal to or less than 0.5 dB/km, an increase in transmission loss that would occur when the optical fiber is housed in a standard ribbon slotted cable can be prevented or reduced.

The SP loss increase is measured in the following manner. Specifically, (1) a bobbin whose body is 380 mm in diameter and on which SiC sandpaper (e.g., No. #380) with an average particle size of 50 μm is wound is prepared; (2) an optical fiber 1 is wound around the body of the bobbin prepared in step (1) with a tension of 100 gf; (3) a transmission loss of the optical fiber 1 wound on the bobbin is measured; (4) the optical fiber 1 is unwound from the bobbin; (5) a transmission loss of the optical fiber 1, which has been unwound from the bobbin and which has almost no tension applied, is measured; and (6) the value of SP loss increase is obtained by subtracting the value obtained in step (5) from the value obtained in step (3).

[Method of Producing Optical Fiber]

The optical fiber 1 can be produced by sequentially carrying out (1) a step of forming a preform and (2) a step of forming the element wire part 11 by melt-drawing the preform. In the step of forming the element wire part 11, the side face of the element wire part 11 is coated with an ultraviolet curable resin, and thereby the primary coating layer 121 and the secondary coating layer 122 are formed.

As used herein, the term "preform" refers to a glass rod that serves as a base material for the element wire part 11. In a case where the element wire part 11 is constituted by: a core 111 in the shape of a circular rod; a depressed layer 112 that covers the side face of the core 111 and that is in the shape of a circular tube; and a cladding layer 113 that covers the outer surface of the depressed layer 112 and that is in the shape of a circular tube, the preform is constituted by: a high-refractive index region (a base material for the core 111) in the shape of a circular rod; a low-refractive index region (a base material for the depressed layer 112) that covers the side face of the high-refractive index portion and that is in the shape of a circular tube; and an intermediate-refractive index region (a base material for the cladding layer 113) that covers the side face of the high-refractive index region and that is in the shape of a circular tube.

Specific procedures of the step of forming a preform are different between the case where the optical fiber 1 is a germanium core optical fiber and the case where the optical fiber 1 is a silica core optical fiber. The following description will discuss specific procedures of the step of forming a preform in each of these cases.

In a case where the optical fiber 1 is a germanium core optical fiber, a preform can be formed by the following procedures.

Procedure 1: a vapor phase axial deposition method (VAD method) is carried out to form a glass rod constituted by a high-refractive index region in the shape of a circular rod and a low-refractive index region that covers the side face of the high-refractive index region and that is in the shape of a circular tube. Specifically, $SiCl_4$ is subjected to flame hydrolysis and thereby silica particles are generated, and these silica particles are deposited on an end of a seed rod (the deposit will grow in the direction of the axis of the seed rod). In doing so, germanium-added silica particles are deposited by including a germanium-based gas such as $GeCl_4$ in inner flame, and fluorine-added silica particles are deposited by including a fluorine-based gas such as $SF_6$, $SiF_4$, $C_2F_6$, or $CF_4$ in outer flame. Then, dehydration is carried out with the use of a chlorine-based gas such as $SOCl_2$ or $Cl_2$, and then the resultant deposit is sintered and vitrified under a high-temperature He atmosphere. This gives a glass rod constituted by a high-refractive index region in the shape of a circular rod (composed of germanium-added silica glass) and a low-refractive index region that covers the side face of the high-refractive index region and that is in the shape of a circular tube (composed of fluorine-added silica glass). The obtained glass rod may be reduced in diameter by melt-stretching in order that subsequent steps can be easily carried out.

Procedure 2: an outside vapor deposition method (OVD method) is carried out to add, to the glass rod formed in procedure 1, an intermediate-refractive index region that covers the side face of the glass rod. Specifically, $SiCl_4$ is subjected to flame hydrolysis and thereby silica particles are generated, and these silica particles are deposited on the side face of the glass rod formed in procedure 1 (the deposit will grow in the circumferential direction of the glass rod formed in procedure 1). Then, dehydration is carried out, and then the resultant deposit is sintered and vitrified (dehydration is not essential). This results in the addition, to the glass rod formed in procedure 1, of the intermediate-refractive index region (composed of additive-free silica glass) that covers the side face of the glass rod. That is, this gives a preform constituted by: a high-refractive index region in the shape of a circular rod; a low-refractive index region that covers the side face of the high-refractive index region and that is in the shape of a circular tube; and an intermediate-refractive index region that covers the outer surface of the low-refractive index region.

Note that, when the OVD method is carried out in procedure 2, a fluorine-based gas, a chlorine-based gas, or the like may be allowed to flow within a furnace and thereby the refractive index of the intermediate-refractive index region may be adjusted. Also note that the base material may be obtained by jacketing the glass rod obtained in procedure 1 with a glass tube instead of carrying out the OVD method in procedure 2.

In a case where the optical fiber 1 is a silica core optical fiber, a preform can be formed by the following procedures.

Procedure 1: a VAD method is carried out to form a glass rod serving as a high-refractive index region. Specifically, $SiCl_4$ is subjected to flame hydrolysis and thereby silica particles are generated, and these silica particles are deposited on an end of a seed rod (the deposit will grow in the direction of the axis of the seed rod). In doing so, neither germanium-based gas nor fluorine-based gas is included in the flame, and thereby additive-free silica particles are deposited. Then, dehydration is carried out with the use of a chlorine-based gas such as $SOCl_2$ or $Cl_2$, and then the resultant deposit is sintered and vitrified under a high-temperature He atmosphere. This gives a glass rod serving as a high-refractive index region. The high-refractive index region may contain chlorine in an amount that is equal to or greater than 0.20 w % and equal to or less than 2.0 w %. The obtained glass rod may be reduced in diameter by melt-stretching in order that subsequent steps can be easily carried out.

Procedure 2: an OVD method is carried out to add, to the glass rod formed in procedure 1, a low-refractive index region that covers the side face of the glass rod. Specifically, SiCl$_4$ is subjected to flame hydrolysis and thereby silica particles are generated, and these silica particles are deposited on the side face of the glass rod formed in procedure 1 (the deposit will grow in the circumferential direction of the glass rod formed in procedure 1). Then, dehydration is carried out, and then the resultant deposit is sintered and vitrified under a He atmosphere containing a high-concentration fluorine-based gas. A fluorine-based gas may be diffused between the dehydration and vitrification. This results in the addition, to the glass rod formed in procedure 1, of a low-refractive index region (composed of high-concentration-fluorine-added silica glass) that covers the side face of the glass rod. That is, this gives a glass rod constituted by: a high-refractive index region in the shape of a circular rod; and a low-refractive index region that covers the side face of the high-refractive index region and that is in the shape of a circular tube. The obtained glass rod may be reduced in diameter by melt-stretching in order that subsequent steps can be easily carried out.

Procedure 3: an OVD method is carried out to add, to the glass rod formed in procedure 2, an intermediate-refractive index region that covers the side face of the glass rod. Specifically, SiCl$_4$ is subjected to flame hydrolysis and thereby silica particles are generated, and these silica particles are deposited on the side face of the glass rod formed in procedure 2 (the deposit will grow in the circumferential direction of the glass rod formed in procedure 2). Then, dehydration is carried out, and then the resultant deposit is sintered and vitrified under a He atmosphere containing a low-concentration fluorine-based gas. A fluorine-based gas may be diffused between the dehydration and vitrification. The dehydration is not essential. This results in the addition, to the glass rod formed in procedure 2, of an intermediate-refractive index region (composed of low-concentration-fluorine-added silica glass) that covers the side face of the glass rod. That is, this gives a preform constituted by: a high-refractive index region in the shape of a circular rod; a low-refractive index region that covers the side face of the high-refractive index region and that is in the shape of a circular tube; and an intermediate-refractive index region that covers the outer surface of the low-refractive index region.

Note that, instead of the OVD method carried out in procedure 2, the glass rod obtained in procedure 1 may be jacketed with a glass tube formed from high-concentration-fluorine-added silica glass. Also note that, instead of the OVD method carried out in procedure 3, the glass rod obtained in procedure 2 may be jacketed with a glass tube formed from low-concentration-fluorine-added silica glass.

[Note]

The present invention is not limited to the previously-described embodiments, but can be altered by a skilled person in the art within the scope of the claims. The present invention also encompasses, in its technical scope, any embodiments derived by combining technical means disclosed in differing embodiments.

Figure 6:
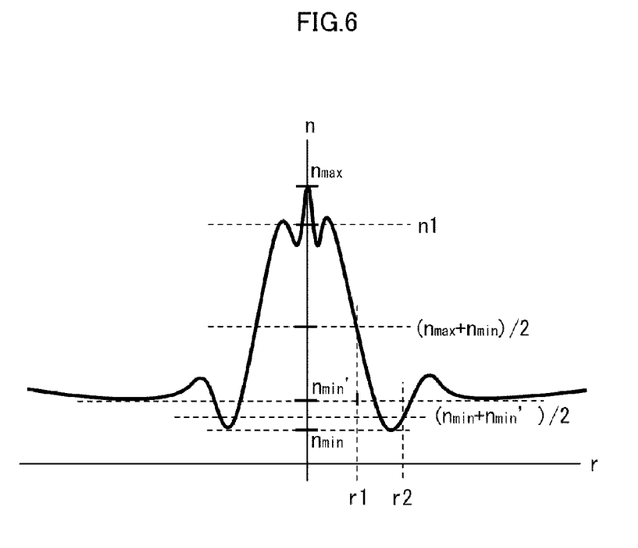
FIG. 6 is a graph showing another refractive index profile of the optical fiber illustrated in FIG. 1.

For example, an optical fiber 1 whose refractive index n in the previously described embodiments is a function of r (the distance from the central axis of the optical fiber) and changes in a stepwise manner as illustrated in FIG. 1; however, the present invention is not limited as such. That is, one or more embodiments can be applied also to an optical fiber 1 whose refractive index profile n is a function of r and changes continuously as illustrated in FIG. 6. In this case, the structural constants r1, r2, Δ1, and Δ2 of the optical fiber 1 can be defined as below.

First, assume that the maximum value of the refractive index n is "nmax", the minimum value of the refractive index n is "nmin", and the smallest value of the refractive index n that appears at a position more distant from the origin than the smallest value "nmin" along the r axis is "nmin'". Then, the value of r at which the refractive index n is the mean of the maximum value nmax and the minimum value nmin (i.e., "(nmax+nmin)/2") is defined as the radius r1 of the core 111. Similarly, larger one of the values of r at each of which the refractive index n is the mean of the minimum value nmin and the smallest value nmin' (i.e., the mean is represented by (nmin+nmin')/2) is defined as the outer radius r2 of the depressed layer 112. Furthermore, the mean of refractive indices n within the range of from the origin to 0.8 times the radius r1 of the core 111 is assumed to be the refractive index n1 of the core 111, and a relative refractive index difference of the refractive index n1 relative to the smallest value nmin' (i.e., "100×(n1−nmin')/nmin'") is defined as Δ1 (positive value in %). Similarly, the minimum value nmin is assumed to be the refractive index n2 of the depressed layer 112, and a relative refractive index difference of the refractive index n2 relative to the smallest value nmin' (i.e., "100×(n2−nmin')/nmin'") is defined as Δ2 (negative value in %).

[Recap]

An optical fiber in accordance with one or more embodiments of the present invention includes: a core; a cladding layer that is lower in refractive index than the core; and a depressed layer that lies between the core and the cladding layer and that is lower in refractive index than the cladding layer, the optical fiber having an effective core area Aeff that is equal to or greater than 100 pmt and equal to or less than 129 μm$^2$, the core having a radius r1 that is equal to or greater than 5.2 μm and equal to or less than 7.4 μm, the core having a refractive index volume Vcore that is equal to or greater than 8.5% μm$^2$ and equal to or less than 16.5% μm$^2$, the depressed layer having a refractive index volume Vdep that is equal to or greater than −40% μm$^2$ and less than 0 μm$^2$.

According to the above arrangement, it is possible to obtain an optical fiber in which microbending loss is suppressed. Specifically, it is possible to obtain an optical fiber in which a propagation constant difference Δβ is equal to or greater than 8500 rad/m. For example, it is possible to obtain an optical fiber in which an increase in transmission loss, which would occur when the optical cable is housed in a standard ribbon slotted cable, will not exceed 0.01 dB/km at a wavelength of 1550 nm.

The optical fiber in accordance with one or more embodiments of the present invention may be such that, in a case where the optical fiber is a germanium core optical fiber, the relative refractive index difference Δ1 is equal to or less than 0.33%.

According to the above arrangement, the loss at a wavelength of 1.55 μm can be suppressed to 0.185 dB/km or less.

The optical fiber in accordance with one or more embodiments of the present invention may be such that, in a case where the optical fiber is a silica core optical fiber, the core has a chlorine concentration that is equal to or more than 0.2 wt % and equal to or less than 2.0 wt %.

According to the above arrangement, the loss at a wavelength of 1.55 μm can be suppressed to 0.175 dB/km or less.

The optical fiber in accordance with one or more embodiments of the present invention may be such that: the effective core area Aeff is equal to or greater than 100 pmt and equal to or less than 110 μm$^2$; the radius r1 of the core is equal to or greater than 5.55 μm and equal to or less than 6.7 μm; the refractive index volume Vcore of the core is equal to or greater than 9.8% μm$^2$ and equal to or less than 14% m$^2$; and the refractive index volume Vdep of the depressed layer is equal to or greater than −30% μm$^2$ and less than 0 μm$^2$.

According to the above arrangement, it is possible to obtain an optical fiber in which microbending loss is suppressed to a greater extent. Specifically, it is possible to obtain an optical fiber in which a propagation constant difference Δβ is equal to or greater than 9700 rad/m. For example, it is possible to obtain an optical fiber in which an increase in transmission loss, which would occur when the optical cable is housed in a standard ribbon slotted cable, will not exceed 0.002 dB/km at 1550 nm.

The optical fiber in accordance with one or more embodiments of the present invention may further include a primary coating layer that covers an outer surface of the cladding layer and a secondary coating layer that covers an outer surface of the primary coating layer, and that: the primary coating layer is a coating layer that is formed from an ultraviolet curable resin whose Young's modulus is equal to or less than 1.0 MPa and that has an outer diameter equal to or greater than 130 μm and equal to or less than 250 μm; and the secondary coating layer is a coating layer that is formed from an ultraviolet curable resin whose Young's modulus is equal to or greater than 500 MPa and that has an outer diameter equal to or greater than 160 μm and equal to or less than 400 μm.

According to the above arrangement, it is possible to obtain an optical fiber in which microbending loss is suppressed to a greater extent.

A production method in accordance with one or more embodiments of the present invention is a method of producing an optical fiber that includes: a core; a cladding layer that is lower in refractive index than the core; and a depressed layer that lies between the core and the cladding layer and that is lower in refractive index than the cladding layer, the optical fiber having a propagation constant difference Δβ equal to or greater than a predetermined value Δβ0 [rad/m], the method including a step of determining a refractive index profile of the optical fiber such that: (a) an effective core area Aeff of the optical fiber is equal to or greater than 100 [μm$^2$] and equal to or less than (16650 [rad/m]−Δβ0 [rad/m])/63.2 [(rad/m)·(1/μm$^2$)]; (b) a radius r1 of the core is equal to or greater than (9329 [rad/m]+Δβ0 [rad/m])/3429 [(rad/m)/μm] and equal to or less than (21180 [rad/m]−Δβ0 [rad/m])/1714 [(rad/m)/μm]; (c) a refractive index volume Vcore of the core is equal to or greater than (−655 [rad/m]+Δβ0 [rad/m])/923 [(rad/m)/(% μm$^2$)] and equal to or less than (16420 [rad/m]−Δβ0 [rad/m])/480 [(rad/m)/(% μm$^2$)]; and (d) a refractive index volume Vdep of the depressed layer is equal to or greater than (−13300 [rad/m]+Δβ0 [rad/m])/120 [(rad/m)/(% μm$^2$)] and less than 0 [μm$^2$].

According to the above method, it is possible to produce an optical fiber in which microbending loss is suppressed to a desired level or lower.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

1 Optical fiber
11 Element wire part
111 Core
112 Depressed layer
113 Cladding layer
12 Coating part
121 Primary coating layer
122 Secondary coating layer

The invention claimed is:

1. An optical fiber comprising:
a core;
a cladding layer that is lower in refractive index than the core; and
a depressed layer that lies between the core and the cladding layer and that is lower in refractive index than the cladding layer, wherein:
the effective core area Aeff is equal to or greater than 105 μm$^2$ and equal to or less than 129 μm$^2$,
a relative refractive index difference Δ1 of a refractive index of the core relative to a refractive index of the cladding layer is equal to or greater than 0.28% and equal to or less than 0.34%, and
a relative refractive index difference Δ2 of a refractive index of the depressed layer relative to the refractive index of the cladding layer is equal to or greater than −0.07% and equal to or less than 0.00%.

2. The optical fiber according to claim 1, wherein:
the core has a radius r1 that is equal to or greater than 5.2 μm and equal to or less than 7.4 μm,
the core has a refractive index volume Vcore that is equal to or greater than 8.5%μm$^2$ and equal to or less than 16.5%μm$^2$, and
the depressed layer has a refractive index volume Vdep that is equal to or greater than −40% μm$^2$ and less than 0%μm$^2$.

3. The optical fiber according to claim 2, wherein a propagation constant difference Δβ is equal to or greater than 8500 rad/m.

4. The optical fiber according to claim 3, wherein:
the optical fiber is a germanium core optical fiber; and
the relative refractive index difference Δ1 of the refractive index of the core relative to the refractive index of the cladding layer is equal to or greater than 0.28% and equal to or less than 0.33%.

5. The optical fiber according to claim 3, wherein:
the optical fiber is a silica core optical fiber; and
the core has a chlorine concentration that is equal to or more than 0.2 wt % and equal to or less than 2.0 wt %.

6. The optical fiber according to claim 2, wherein:
the effective core area Aeff is equal to or greater than 105 μm$^2$ and equal to or less than 110 μm$^2$;
the radius r1 of the core is equal to or greater than 5.55 μm and equal to or less than 6.7 μm;
the refractive index volume Vcore of the core is equal to or greater than 9.8% μm$^2$ and equal to or less than 14% μm$^2$; and
the refractive index volume Vdep of the depressed layer is equal to or greater than −30% μm$^2$ and less than 0% μm$^2$.

7. The optical fiber according to claim 6, wherein a propagation constant difference $\Delta\beta$ is equal to or greater than 9700 rad/m.

8. The optical fiber according to claim 2, further comprising: a primary coating layer that covers an outer surface of the cladding layer; and a secondary coating layer that covers an outer surface of the primary coating layer, wherein
the primary coating layer is a coating layer that is formed from an ultraviolet curable resin whose Young's modulus is equal to or less than 1.0 MPa and that has an outer diameter equal to or greater than 130 μm and equal to or less than 250 μm, and
the secondary coating layer is a coating layer that is formed from an ultraviolet curable resin whose Young's modulus is equal to or greater than 500 MPa and that has an outer diameter equal to or greater than 160 μm and equal to or less than 400 μm.

9. The optical fiber according to claim 2, wherein chromatic dispersion at a wavelength of 1.55 μm is equal to or greater than 18.8 ps/nm/km and is equal to or less than 21.1 ps/nm/km.

10. A method of producing an optical fiber that includes: a core; a cladding layer that is lower in refractive index than the core; and a depressed layer that lies between the core and the cladding layer and that is lower in refractive index than the cladding layer, wherein the optical fiber has a propagation constant difference $\Delta\beta$ equal to or greater than a predetermined value $\Delta\beta0$ [rad/m], the method comprising: determining a refractive index profile of the optical fiber such that:

(a) an effective core area Aeff of the optical fiber is equal to or greater than 100 [μm$^2$] and equal to or less than (16650 [rad/m]−$\Delta\beta0$ [rad/m])/63.2 [(rad/m)−(1/μm$^2$)];

(b) a radius r1 of the core is equal to or greater than (9329 [rad/m]+$\Delta\beta0$ [rad/m])/3429 [(rad/m)μm] and equal to or less than (21180 [rad/m]−$\Delta\beta0$ [rad/m])/1714 [(rad/m)μm];

(c) a refractive index volume Vcore of the core is equal to or greater than (−655 [rad/m]+$\Delta\beta0$ [rad/m])/923 [(rad/m)/(%μm$^2$)] and equal to or less than (16420 [rad/m]−$\Delta\beta0$ [rad/m])/480 [(rad/m)/(%μm$^2$)]; and (d) a refractive index volume Vdep of the depressed layer is equal to or greater than (−13300 [rad/m]+$\Delta\beta0$ [rad/m])/120 [(rad/m)/(%μm$^2$)] and less than 0 [(%μm$^2$)].

* * * * *